United States Patent Office 3,474,171
Patented Oct. 21, 1969

3,474,171
2,2-DIMETHYL-2,3-DIHYDROBENZOFURANYL-
7-N-METHYLCARBAMATE
William G. Scharpf, Rocktown, N.J., assignor to FMC
Corporation, New York, N.Y., a corporation of
Delaware
No Drawing. Filed Jan. 23, 1964, Ser. No. 339,612
Int. Cl. A01n 9/28; C07d 5/34
U.S. Cl. 424—285                                    4 Claims This invention relates to a new chemical compound and its method of preparation, to pesticidal compositions containing said new compound, and to the use of said compound to control insect pests, including acarids. More particularly, this invention relates to the compound 2,2-dimethyl - 2,3-dihydrobenzofuranyl-7-N-methylcarbamate, discovered to be a novel and effective insecticide.

The compound of this invention is represented by the structural formula:

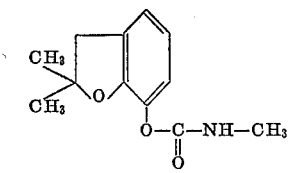

Said compound exhibits outstanding pesticidal activity, including effective activity against Coleoptera (beetles), Hemiptera (true bugs), Homoptera (aphids) and Acaridae (acarids).

This new compound may be prepared by reacting methyl isocyanate with 7 - hydroxy-2,2-dimethyl-2,3-dihydrobenzofuran to give the corresponding N-methylcarbamic acid ester. This intermediate compound, 7-hydroxy-2,2-dimethyl-2,3-dihydrobenzofuran, is also a new and useful compound, and may be prepared by a novel rearrangement and cyclization reaction. The overall synthesis represents a novel and useful reaction sequence.

The preparation is illustrated in the following specific examples, which are provided by way of illustration and not of limitation. All parts are by weight unless otherwise indicated, and all temperatures in degrees centigrade.

EXAMPLE 1

Preparation of dimethyl-2,3-dihydrobenzofuranyl-7-
N-methylcarbamate

This compound was prepared by a novel technique whereby 2-methallyloxyphenol was cyclized and rearranged to form a 7-hydroxybenzofuran, followed by esterification to form the carbamate. The starting material 2-methallyloxyphenol was prepared as follows: To a stirred mixture of 322 parts of catechol in 300 parts of dry acetone was slowly added, under nitrogen atmosphere, 401 parts of potassium carbonate and 481 parts of potassium iodide. The mass was heated to reflux temperature, and 262 parts of methallyl chloride was added slowly. The mixture was refluxed for 30 hours, allowed to cool and stand for 18 hours, filtered, and the filtrate concentrated under reduced pressure. The residual oil was extracted with chloroform, and the chloroform solution was washed with water, dried, and concentrated. The residual oil was distilled to give 213 parts of 2-methallyloxyphenol, B.P. 78.5–83.0°/0.55 mm., $n_D^{25°}$ 1.5300.

7 - hydroxy - 2,2 - dimethyl-2,3-dihydrobenzofuran was prepared as follows: A round-bottom flask containing 131 parts 2-methallyloxyphenol was heated slowly with stirring. At 200° C. an exothermic reaction occurred, and the temperature of the mixture in the flask increased rapidly to 275°. The temperaturewas controlled at 275° by external cooling. The thick syrup was distilled under reduced pressure to yield colorless liquid 7-hydroxy-2,2-dimethyl-2,3 - dihydrobenzofuran, B.P. 78–80°/0.35–40 mm., $n_D^{25°}$ 1.5401.

2,2 - dimethyl - 2,3 - dihydrobenzofuranyl-7-N-methylcarbamate was prepared as follows: A cold solution of 16.4 parts 7 - hydroxy - -2,2 - dimethyl-2,3-dihydrobenzofuran in 14 parts of ether was treated with 5.8 parts methyl isocyanate and 0.1 part triethylamine. The mixture was stirred at room temperature, and a white crystalline product precipitated. Separation of the solid yielded 17.5 parts of product, M.P. 151–2° C. Recrystallization from methylclclohexane gave an analytical sample.

Analysis.—Calcd. for $C_{12}H_{15}NO_2$: N, 6.33. Found: N, 6.57.

EXAMPLE 2

Insecticidal activity

Insecticidal activity, including acaricidal activity, was demonstrated as follows: The compound 2,2-dimethyl-2,3 - dihydrobenzofuranyl-7-N-methylcarbamate was dissolved to form a 1% solution in acetone, which was then diluted with water to provide a concentration of 1250 p.p.m. of active ingredient. Test insects and techniques were as follows: the Mexican bean bettle (*Epilachna varivestis* (Mulsant)) and southern armyworm (*Prodenia eridania* (Cramer)) on pinto bean plants whose leaves were dipped in the test solution before infestation; two-spotted spider mite (*Tetranychus telarius* (Linnaeus)) on pinto bean plants whose leaves were dipped after infestation; pea aphid (*Macrosiphum pisi* (Harris)) on broad beans, and milkweed bug (*Oncopeltus fasciatus* (Dallas)) by spraying glass dishes containing the insects.

After seventy-two hours of exposure of the test insect to the test solution as described above, the percent kill was counted. Results presented below are each an average of three replicates:

| Test insect: | Percent kill at 1250 p.p.m. |
|---|---|
| Mexican bean beetle | 100 |
| Pea aphid | 100 |
| Southern armyworm | 100 |
| Two-spotted mite | 51 |
| Milkweed bug | 100 |

This compound may also be prepared by methods other than the preferred embodiment set forth above. Other compounds of this general class may also be prepared. Their insecticidal activity is of the high order illustrated.

EXAMPLE 3

Systemic insecticidal activity

This compound also exhibits useful systemic insecticidal activity. This may be illustrated as follows: A 1% solution of 2,2 - dimethyl - 2,3 - dihydrobenzofuranyl-7-N-methylcarbamate in acetone was diluted with water to a concentration of 156 p.p.m. of active ingredient. The roots of pinto bean plants at the bifoliate stage of growth were excised, and the plant stems suspended in the solution of the test compound. After three days of immersion of the plant stems, the leaves of the plant were infested with the test insect. Three days after infestation, counts of the percent kill were made. Results are tabulated below:

| Test insect: | Percent kill at 156 p.p.m. |
|---|---|
| Mexican bean beetle | 100 |
| Pea aphid | 100 |
| Two-spotted mite | 100 |
| Southern armyworm | 100 |

The above results demonstrate excellent systemic activity.

The compound of this invention is toxic to a variety of crop pests and household pests. The active ingredient may be applied to plant foliage or other surfaces in the form of sprays, as a solid dust or granular compositions, or as baits.

The compound may be made into liquid concentrates by solution or emulsification in suitable liquids, and into solid concentrates by admixing with talc, clays and other known solid carriers used in the insecticide art. These concentrates are compositions containing about 10–50% toxicant and the rest inert material which includes dispersing agents, emulsifying agents, and wetting agents. The concentrates are diluted for practical application, with water or other liquid for liquid sprays or with additional solid carrier for application as a dust or granular formulation. The concentration of the toxicant as generally applied for control of insects is normally in the range of about 2% to about 0.001%. Baits are generally prepared by mixing such concentrates with a suitable food, such as a mixture of cornmeal and sugar. Many variations of spraying and dusting compositions in the art may be used, by substituting the compound of this invention into compositions known or apparent to the art.

I claim:

1. The compound 2,2-dimethyl - 2,3 - dihydrobenzofuranyl-7 N-methylcarbamate, of the formula

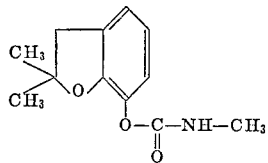

2. Insecticidal composition comprising an extender and, as an active insecticidal ingredient, an effective amount of the compound 2,2-dimethyl-2,3-dihydrobenzofuranyl-7 N-methylcarbamate.

3. Method of controlling insects which comprises subjecting them to effective doses of the compound 2,2-dimethyl-2,3-dihydrobenzofuranyl-7 N-methylcarbamate.

4. Method of controlling acarids which comprises contacting them with an effective amount of a compound having the formula

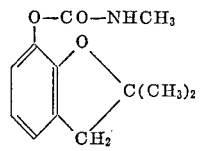

References Cited

UNITED STATES PATENTS

| | | | |
|---|---|---|---|
| 2,659,734 | 11/1953 | Geissman | 260—346.2 |
| 3,131,199 | 4/1964 | Roe et al. | 260—346.2 |
| 2,406,294 | 8/1946 | Hansen et al. | 167—33 |
| 2,418,458 | 4/1947 | Bousqust | 167—33 |
| 2,362,479 | 11/1944 | Gibbs | 260—800 |
| 3,073,848 | 1/1963 | Wasson et al. | 260—347.4 |

ALEX MAZEL, Primary Examiner

BERNARD I. DENTZ, Assistant Examiner

U.S. Cl. X.R.

260—346.2